United States Patent [19]
Potash et al.

[11] Patent Number: 4,744,024
[45] Date of Patent: May 10, 1988

[54] METHOD OF OPERATING A BUS IN A DATA PROCESSING SYSTEM VIA A REPETITIVE THREE STAGE SIGNAL SEQUENCE

[75] Inventors: Hanan Potash, La Jolla; Melvyn E. Genter, San Diego, both of Calif.

[73] Assignee: Burroughs Corporation, Detroit, Mich.

[21] Appl. No.: 633,662

[22] Filed: Jul. 23, 1984

Related U.S. Application Data

[63] Continuation of Ser. No. 412,281, Aug. 27, 1982, abandoned, which is a continuation of Ser. No. 135,638, Mar. 31, 1980, abandoned.

[51] Int. Cl.$^4$ .............................................. G06F 13/00
[52] U.S. Cl. ........................................ 364/200; 370/85
[58] Field of Search ... 364/200 MS File, 900 MS File; 370/85

[56] References Cited

U.S. PATENT DOCUMENTS

| | | | |
|---|---|---|---|
| 3,710,324 | 1/1973 | Cohen et al. | 364/200 |
| 3,710,351 | 1/1973 | Nakamura | 364/200 |
| 3,866,175 | 2/1975 | Seifert, Jr. et al. | 340/825.52 |
| 3,932,841 | 1/1976 | Deerfield et al. | 364/200 |
| 4,015,246 | 3/1977 | Hopkins, Jr. et al. | 364/200 |
| 4,096,569 | 6/1978 | Barlow | 364/200 |
| 4,096,571 | 6/1978 | Vander May | 364/200 |
| 4,161,786 | 7/1979 | Hopkins et al. | 364/900 |
| 4,195,351 | 3/1980 | Barner et al. | 364/900 |
| 4,223,380 | 9/1980 | Antonaccio et al. | 364/200 |
| 4,271,465 | 6/1981 | Ohtsuka et al. | 364/200 |
| 4,281,380 | 7/1981 | DeMosa, III et al. | 364/200 |
| 4,285,037 | 8/1981 | Von Stetten | 364/200 |

*Primary Examiner*—Eddie P. Chan
*Attorney, Agent, or Firm*—Charles J. Fassbender; L. Joseph Marhoefer

[57] ABSTRACT

Disclosed is a data processing system which is comprised of a plurality of devices that carry on conversations with each other over a time-shared bus. These conversions can consist of a message from a device A to a device B which is immediately followed by a message from device B back to device A, or a message from device A to device B which is immediately followed by a message from device B to another device C, or a single message from device A to device B. In each case, the last device to receive a message assumes control of the bus; and it relinquishes this control by either sending a message to another device or by broadcasting a poll code to all devices on the bus.

6 Claims, 6 Drawing Sheets

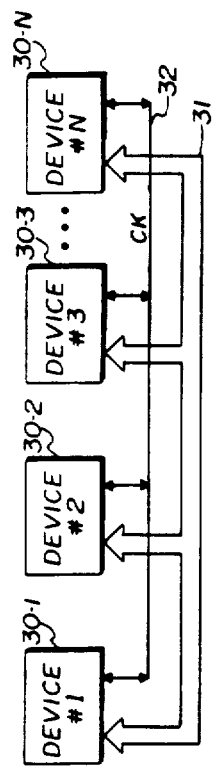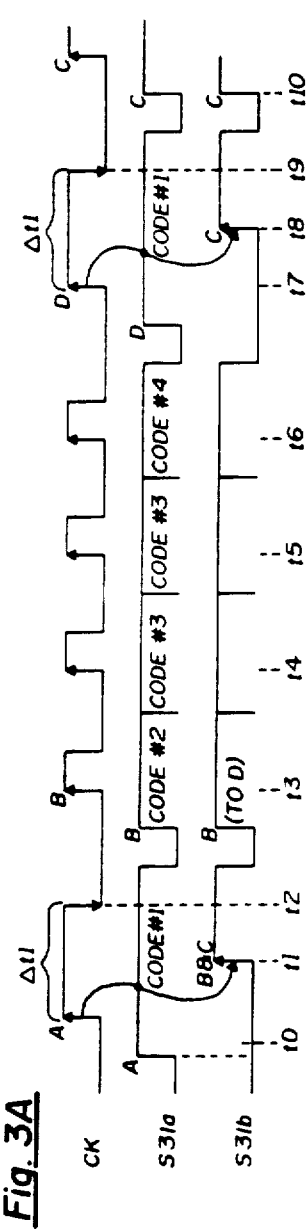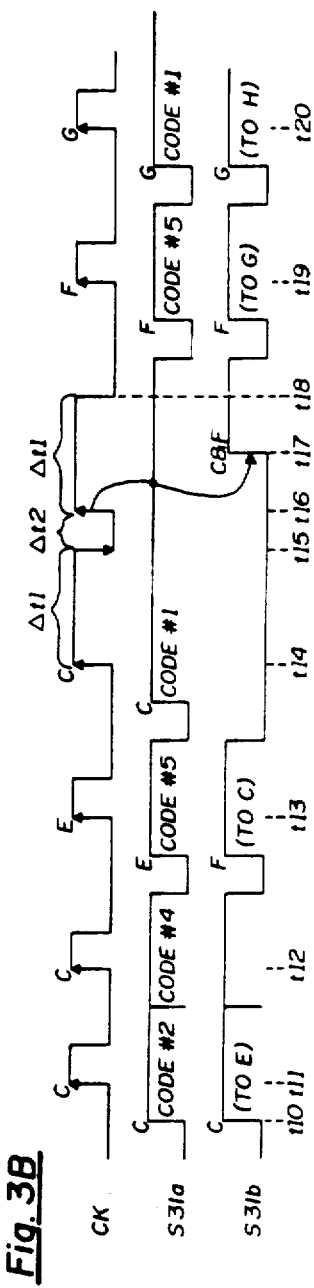
Fig. 2
Fig. 3A
Fig. 3B

METHOD OF OPERATING A BUS IN A DATA PROCESSING SYSTEM VIA A REPETITIVE THREE STAGE SIGNAL SEQUENCE

This is a continuation of application Ser. No. 412,281, filed Aug. 27, 1982; which was a continuation of Ser. No. 135,638, filed Mar. 31, 1980; both now abandoned.

BACKGROUND OF THE INVENTION

This invention relates to digital data processing systems which are comprised of a plurality of devices that send messages to each other over a time-shared bus. Each device in the system may be any type of digital equipment. For example, one device might be a digital processor, another device might be a disc, another device might be a printer, etc.

One such prior art digital processing system, which is utilized by NCR, is illustrated in FIG. 1A. There, the plurality of devices are indicated by reference numerals 10-1 through 10-N; and the time-shared bus over which they send messages is indicated by reference numeral 11. All message transfers on bus 11 are synchronized by a fixed frequency clock signal which is generated by a bus controller 12 on a line 13.

Controller 12 also determines the priority by which the devices send messages over bus 11. To that end, controller 12 receives a "request" signal from each device over separate control lines 14-1 through 14-N; and it sends a "request granted" signal back to each device over separate control lines 15-1 through 15-N. These control lines are not time-shared by the devices.

Also, controller 12 monitors all messages on bus 11 to determine if a parity error occurs. If an error does occur, then controller 12 sends a signal on another separate control line 16 to the device which received the erroneous message.

An undesirable aspect of the FIG. 1A system is that if a device receives a message which requires a response message to be sent, that response message cannot be sent immediately. Instead, the receiving device must first "ask" bus controller 12 if it can use the bus. Typically, several other devices will transmit messages on the bus before the receiving device is permitted to send its response. Thus communication between devices on bus 11 occurs in a random illogical order.

Another undesirable aspect of the FIG. 1A system is that too many separate control lines are required for operating bus 11. These are lines 14-1 through 14-N, 15-1 through 15-N, and 16 as described above. This drawback is most severe for large systems, because the number of control lines increases as the number of devices increases.

Further, the FIG. 1A system is totally dependent on bus controller 12 for its operation. That is, the system simply will not work when controller 12 needs repair. This is true even though devices 14-1 through 14-N may be completely operational.

Another prior art data processing system which includes a time-shared bus is illustrated in FIG. 1B. That system is utilized by IBM. There, the devices are indicated by reference numerals 20-1 through 20-N; and the time-shared bus on which messages are sent is indicated by reference numeral 21. All message transfers occur between one of the devices and bus controller 22, which is also called a channel.

In operation, bus controller 22 sends spaced apart polling pulses down a separate control line 23. A path for these pulses to pass serially through each device is established by the placement of three jumper wires as indicated by dashed lines in FIG. 1B. Any device may transmit a message to controller 22 only after it receives a polling pulse on line 23, blocks that pulse from traveling further down the line, and sends a signal on another control line 24 which tells controller 22 to stop generating pulses until the message is sent. Each device generates its own asynchronous clocking signals on respective lines 25-1 through 25-4 to transfer messages on bus 21. A device which has no message to send simply allows the pulses on line 23 to pass to the next device.

Once a device obtains the use of the bus 21, messages can be sent from that device to bus controller 22 and the controller can respond by immediately sending another message back to that same device. But the channel cannot respond by sending a message back to a second device. Also, one device cannot send a message directly to another device.

The IBM system does utilize fewer control lines than does the system of FIG. 1A. But even so, the IBM system still requires some separate control lines and still depends on a separate bus controller for its operation. Further, the above reduction in control lines 1B are obtained only at the cost of making the priority by which a device may obtain the bus very inflexible. That priority is limited by the device's position on the bus. Device 20-4 can have either the first or last priority; device 20-3 can have either first or second or next-to-last or last priority; etc.

Accordingly, it is a primary objective of the invention to provide an improved data processing system.

Another object of the invention is to provide a data processing system in which a plurality of devices can carry on conversations with each other in any logical sequence without interruption.

Another object of the invention is to provide a data processing system having a time-shared bus over which a plurality of digital devices communicate without any separate bus controller or separate control lines.

Another object of the invention is to provide an improved digital device for transmitting messages on a time-shared bus.

Still another object of the invention is to provide an improved digital device for selectively receiving messages on a time-shared bus.

SUMMARY OF THE INVENTION

These and other objects are accomplished in accordance with the invention by a digital data processing system comprised of a plurality of devices coupled to a bus having first and second sets of time-shared lines.

Each device which transmits messages includes one circuit for obtaining the use of the bus by sending a signal on one line of the first set in response to any one of the modules broadcasting a poll code on the lines of the second set and by examining the signal state of all of the lines of the first set; another circuit for sending a message over the first and second sets of lines to a selectable module after said bus is obtained; and another circuit for detecting whether the selectable module either broadcasts a poll code on the second set of lines following the sending of the message or sends another message to another one of the modules.

Also, each device which receives a message includes a circuit for selectively receiving a message over the first and second sets of lines from one of the modules; another circuit for sending either another message to a module on the bus or broadcasting a poll code over the second set of lines to all of the modules; and a circuit for detecting if any of the modules respond to the poll code by sending a signal on any line of the first set.

Due to the above architecture, conversations can occur in an uninterrupted fashion among any number of devices on the bus. No bidding for the bus is required each time a new device takes part in the conversation, because the last device to receive a message has the option of transmitting a message in response.

Also, the system needs no separate bus controller. Instead each device which receives a message shares in the responsibility of controlling the bus by being a broadcaster of a poll code. Thus, there is no bus controller on which the system's operability depends. If one device needs repair, it is taken off line and the system still runs at reduced capacity.

Further, no separate control lines exist in the above system. All lines are time-shared. This minimizes the total number of lines between devices and minimizes cost. At the same time, no flexibility in the priority by which a device acquires the use of the bus is sacrificed.

Also, message transmission in the disclosed system is very efficient. No separate messages or lines are needed to report fault free transmission. This is achieved by designing the device which transmitted the last message on the bus to interpret a poll code from the receiving device as an acknowledgement that the message was received error free in addition to a polling cycle. Typically, errors (faults, or exceptions) occur very infrequently, and thus it is important to not degrade message throughput by taking bus time to acknowledge normal messages.

BRIEF DESCRIPTION OF THE DRAWINGS

Various features and advantages of the invention will best be understood by reference to the following detailed description and accompanying drawings wherein:

FIG. 2 is a block diagram of a data processing system constructed according to the invention.

FIGS. 3A and 3B are timing diagrams illustrating the operation of the data processing system of FIG. 2.

DETAILED DESCRIPTION

Figure 1A:
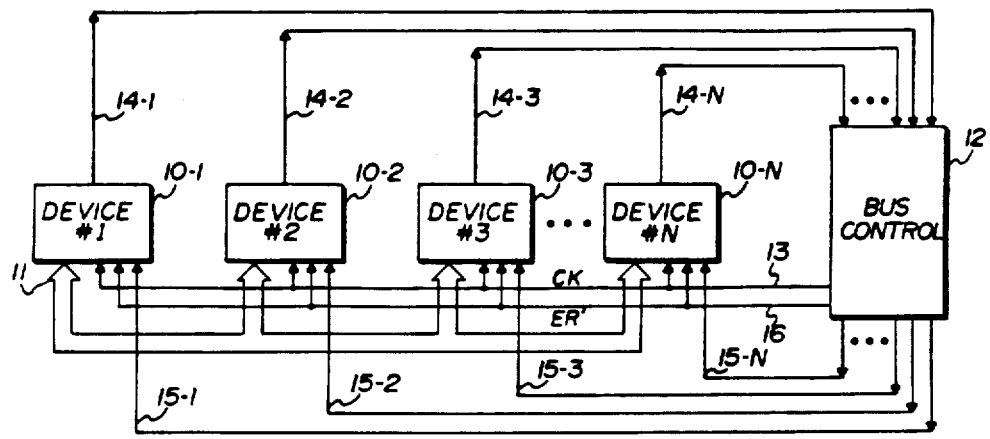
FIGS. 1A and 1B are block diagrams of prior art data processing systems.
Figure 1B:
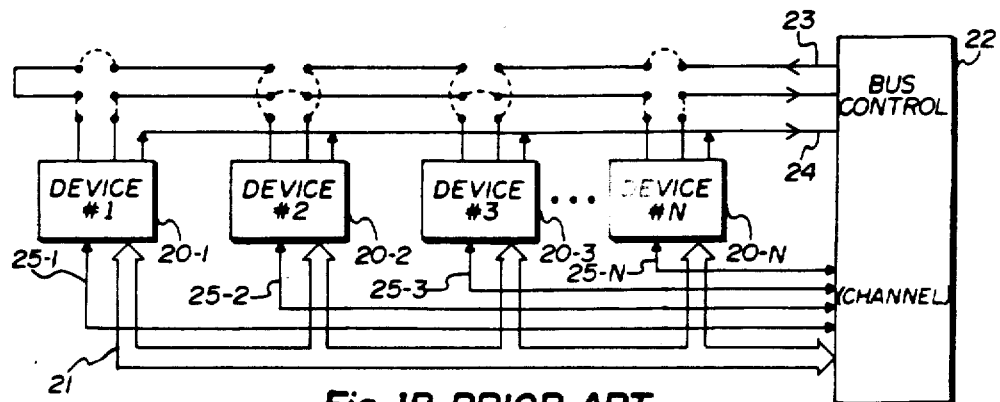

Referring now to FIG. 2, the details of a preferred embodiment of a data processing system which is constructed according to the invention will be described. This embodiment includes a plurality of devices 30-1 through 30-N which communicate with each other over a time-shared bus 31. Each device may be any type of digital equipment, such as a data processor, a disc, a printer, etc. All messages on bus 31 are synchronized by a clock signal CK which is generated on a line 32 by the device that is transmitting messages on bus 31. No separate bus controller or separate control lines for obtaining the use of bus 31 exists in the system.

To understand how a device obtains the use of bus 31 and transmits a message thereon, consider now the timing diagrams of FIGS. 3A and 3B. In those figures, the letters A–G each represent the device which is generating a signal on bus 31 at a particular time instant. Also, signals S31a and S31b indicate steady signals which are generated on respective sets of lines 31A and 31B in bus 31. For example, at time instant t2, device A is generating clock signal CK of line 32 and steady signals on lines 31A; whereas devices B and C are generating steady signals on leads 31B.

Assume initially that at time instant t1, device A has just received a message over bus 31 from another device. When that occurs, device A examines the message to determine if any further dialog on the bus is required. Additional dialog may be needed for example, if the received message was a request to write into a protected area, or if the message caused the receiver's input buffer to overflow, etc. If no further dialog is needed, device A then has the responsibility of generating a code #1 on lines 31A, and generating clock signal CK on line 32 with a predetermined width $\Delta t1$.

All devices which desire to transmit a message on bus 31, must respond to the concurrent occurrence of code #1 and the rising edge of signal CK by generating a steady signal on a respective one of the lines 31B. This is illustrated as occurring at time instant t2 where device B and C both generate signals on lines 31B. Thereafter, at the trailing edge of clock signal CK, all of the devices on the bus examine the state of the signals on lines 31B. This trailing edge is illustrated as occurring at time instant t3.

If a steady signal is generated by any device on any of the lines 31B, then device A stops generating clock signal CK and stops generating code #1 on lines 31A. Also, all of the devices which generated a steady signal on one of the lines 31B, examine the signal state of lines 31B to determine within themselves if they are the highest priority device. That device which is of the highest priority must then transmit its message over bus 31.

In the illustrated example, device B is presumed to be of higher priority than device C. It responds in the illustrated example by sending a four word message to device D. Signals S31A are sequentially encoded by device B as a code #2, a code #3, and a code #4 which respectively indicate that the first word of a multiple word message, a middle word of a multiple word message, and the last word of a multiple word message is being sent. Code #2 in combination with a portion of the signals on lines 31B also indicate which device is to receive the message.

All of the words of the message are synchronized by the rising edge of clocking signal CK which is generated by device B at time instants t4–t6. After device D has received the entire message, it examines the words to determine if any further communication is required. One other example of when that would be appropriate would be if device B sent the words of its message out of sequence—i.e., it sent first word, middle word, first word. If no further communication is needed, then device D has the responsibility of generating code #1 on lines 31A and simultaneously generating a clocking signal of width $\Delta t1$. This clocking signal is illustrated as beginning at time instant t7.

Device B, which previously sent the message to device D, also has the responsibility of examining lines 31A to determine whether or not device D generates a code #1 thereon. This code is interpreted by device B as an implicit indication that its message was received and no further communication is needed. All other devices on bus 31 and device B must also respond to code #1 as was previously described. That is, they must generate a steady signal level on a respective one of the lines 31B if they want to use bus 31. Device C is illustrated as sending a steady signal on one of those lines at time instant t8.

At the falling edge of clock signal CK, which is illustrated as occurring at time instant t9, both device C and D examine the signal state of lines 31B. Since one of those lines has a steady signal generated thereon, device D terminates its transmission of clock signal CK and code #1 on bus 31. Also since device C is the only device which is sending a steady signal on lines 31, it begins its message transmission as illustrated at time instant t10.

Device C is illustrated as transmitting a two word messge to device E. It accomplishes this tranmission by sequentially generating code #2 and code #4 on lines 31A and simultaneously generating clocking signal CK at time instants t11 and t12.

Assume now that device E wants to reply with a single word message to device C. Device E does this by generating a code #5 on lines 31A and simultaneously generating clocking signal CK. This is illustrated at time instant t13. Device E also generates additional signals on lines 31B, which include the address of device C and the details of the message that it is sending to device C.

In response to the receipt of the code 5 message, device C is given control of bus 31. It then has the responsibility of communicating further with device E or any other device on bus 31, or of giving up the bus by broadcasting code #1 on lines 31A. In the illustrated example, device C performs the latter option at time instant t14.

In response to the code #1 broadcast, device E which was the last device to transmit on bus 31, again interprets that code as an implied indication that the code #5 message was received and further dialog is unnecessary. Also, all devices on bus 31 interpret code #1 as a polling code which has been described above.

Next, at time instant t15, device C examines the signal state on lines 31B to determine if any device has generated a steady signal thereon. In the illustrated example, none of the devices on bus 31 have requested its use. Under those conditions, device C has the responsibility of regenerating another polling cycle. This is illustrated as starting at time instant t16.

In response to the second polling cycle, devices C and F both make requests to use the bus by generating respective steady signals on lines 31B. That is, a device which generates code #1 can also respond to that code by generating a steady signal on one of the lines 31B. This is illustrated at time instant t17.

Subsequently at the trailing edge of clock signal CK, which occurs at time instant t18, devices C and F both examine the signal state of lines 31B. In this example, device F is presumed to have higher priority than device C. Thus device C terminates its generating of signals on the bus 31 and clock line 32, and device F begins it message transmission.

At time instant t19, device F is illustrated as transmitting a one word message to device G. Code #5 is again interpreted to mean a one word message. Thereafter, device F terminates its signaling on the bus 31 and clock line 32, and monitors the response which is generated on those lines by the receiving device G. This response, which occurs at time instant t20, is illustrated as being a one word message to another device H. Device H then assumes control of the bus as described above.

An important feature of the above described data processing system is it permits uninterrupted conversations to occur on the bus among any number of devices. No bidding for the bus is required each time a new device takes part in the conversation. This is achieved by having the device which received the last message assume control of the bus.

Another important feature of the above system is that it needs no separate bus controller for its operation. Instead, each device in the system shares in the responsibility of determining which device may use the bus. Thus, there is no separate bus controller which must be operable before the entire system can work. If one device needs repair, it can be taken off of the bus; and the system still operates at reduced capacity.

The disclosed system also requires absolutely no separate control lines to allocate the use of the bus. All lines are time-shared. This minimizes the total number of lines between devices, which simplifies cabling and reduces cost. Further, this is achieved without sacrificing the flexibility by which a device can be assigned a priority on the bus.

Also in the disclosed system, message transmission is very efficient because fault or exception free messages are acknowledged without consuming any bus time. This is achieved by designing the device which transmitted the last message on bus 31 to interpret a poll code from the receiving device as an error free acknowledgement in addition to a polling cycle. Typically, faults or exceptions occur very infrequently and thus it is important to not degrade message throughput by taking bus time to acknowledge normal messages.

Figure 4A:
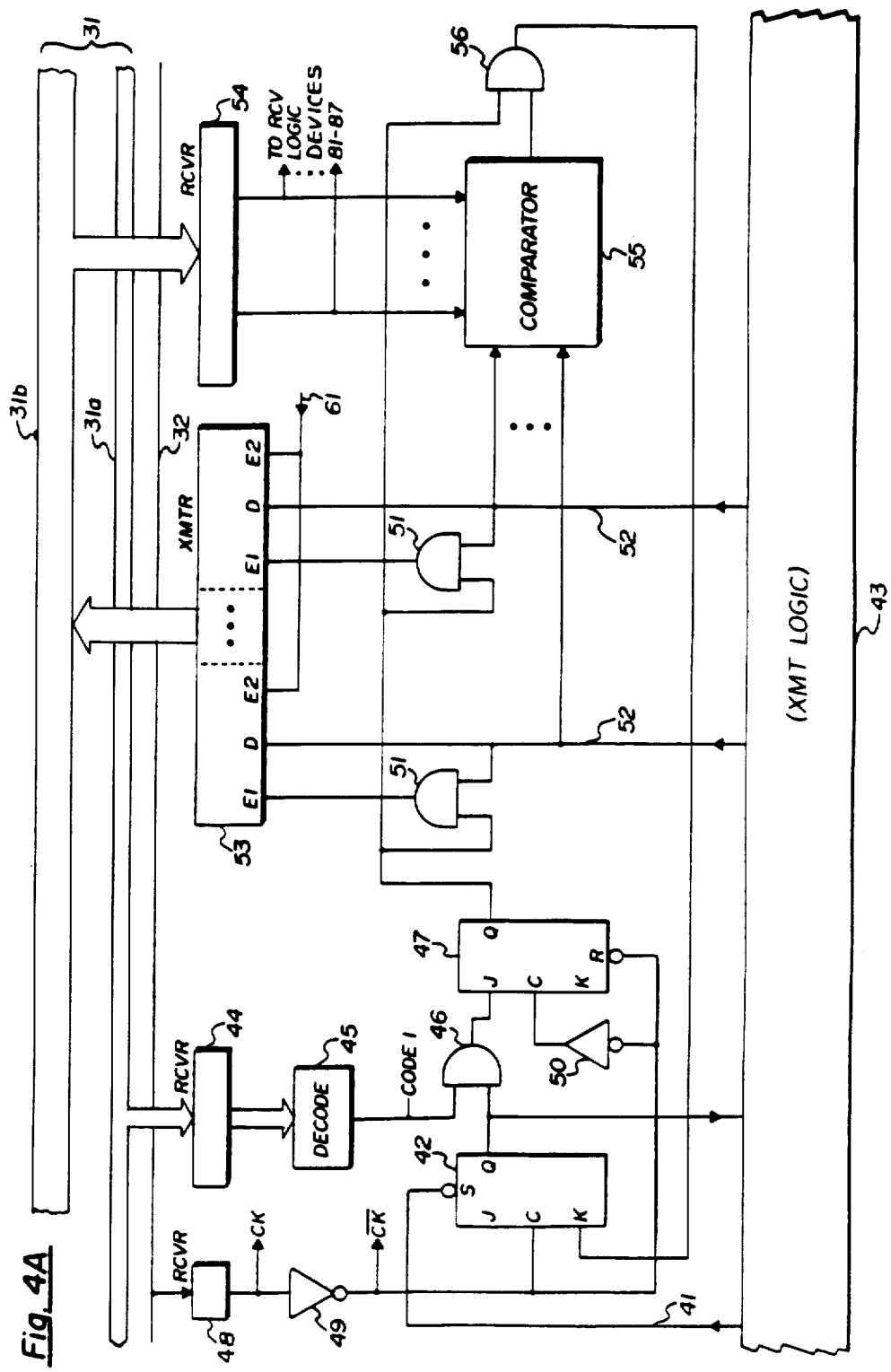
FIGS. 4A and 4B are detailed logic diagrams of that portion of a device which transmits messages in the data processing system of FIG. 2.
Figure 4B:
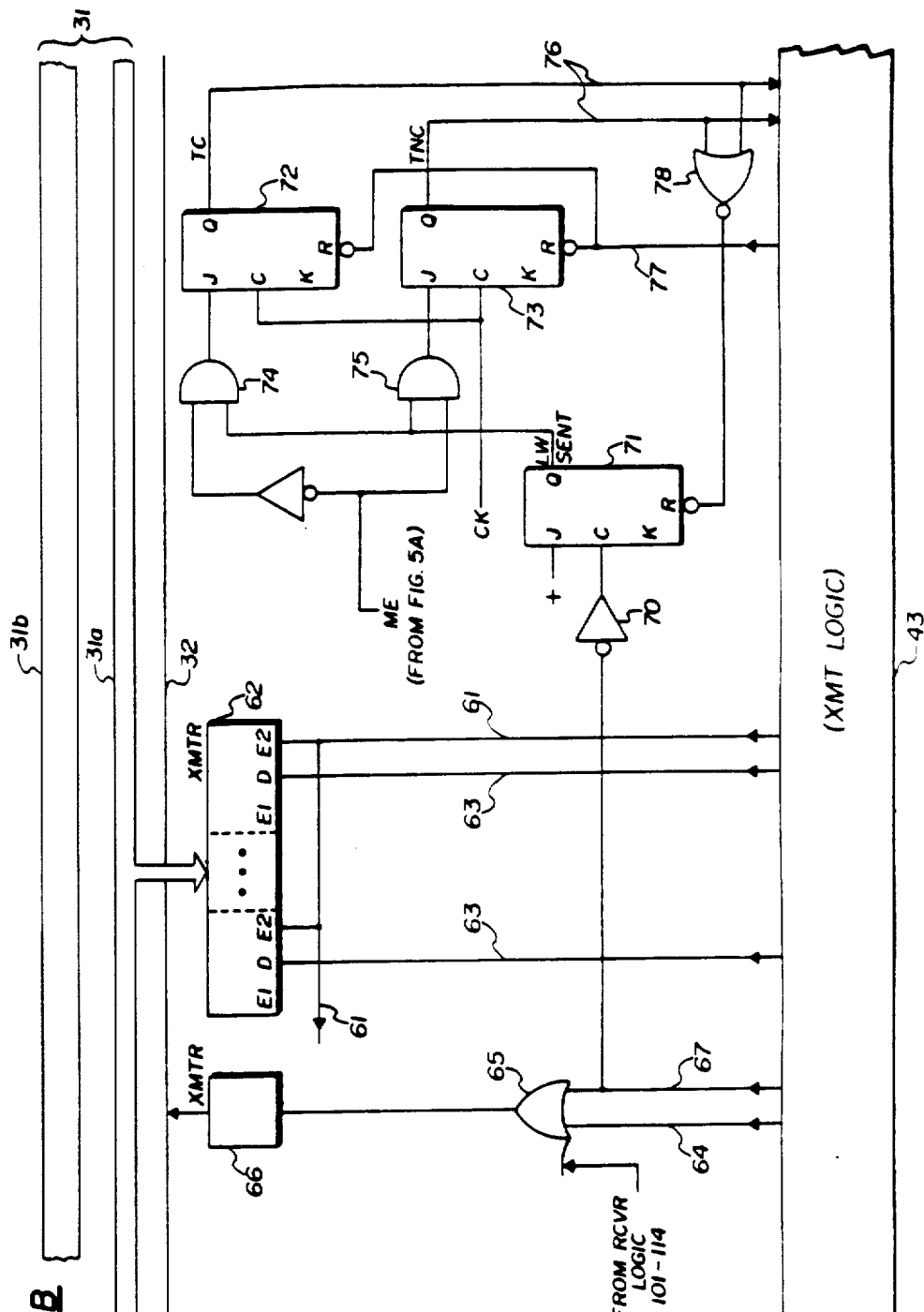
Figure 5A:
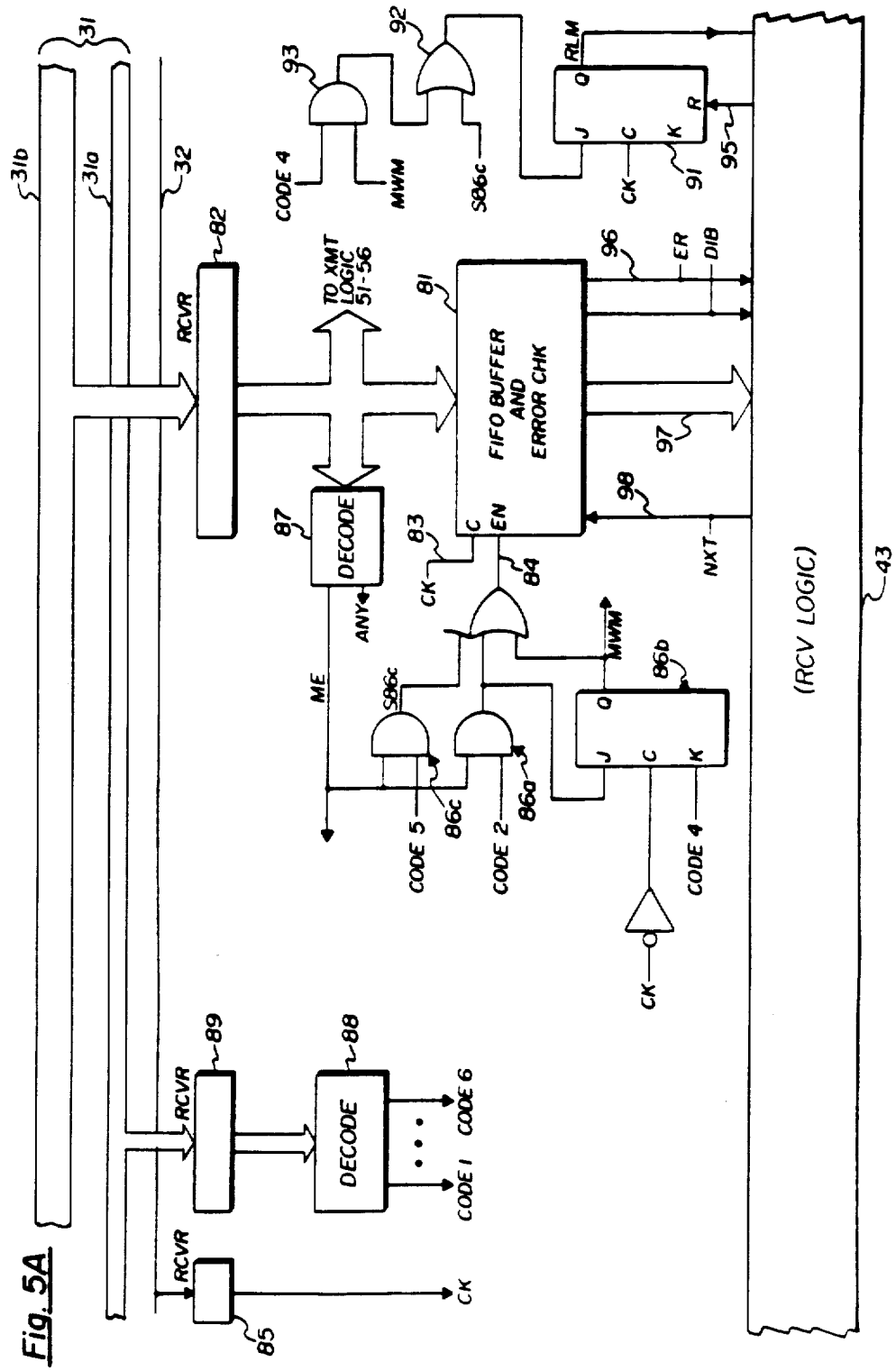
FIGS. 5A and 5B are detailed logic diagrams of that portion of a device which receives messages in the data processing system of FIG. 2.
Figure 5B:
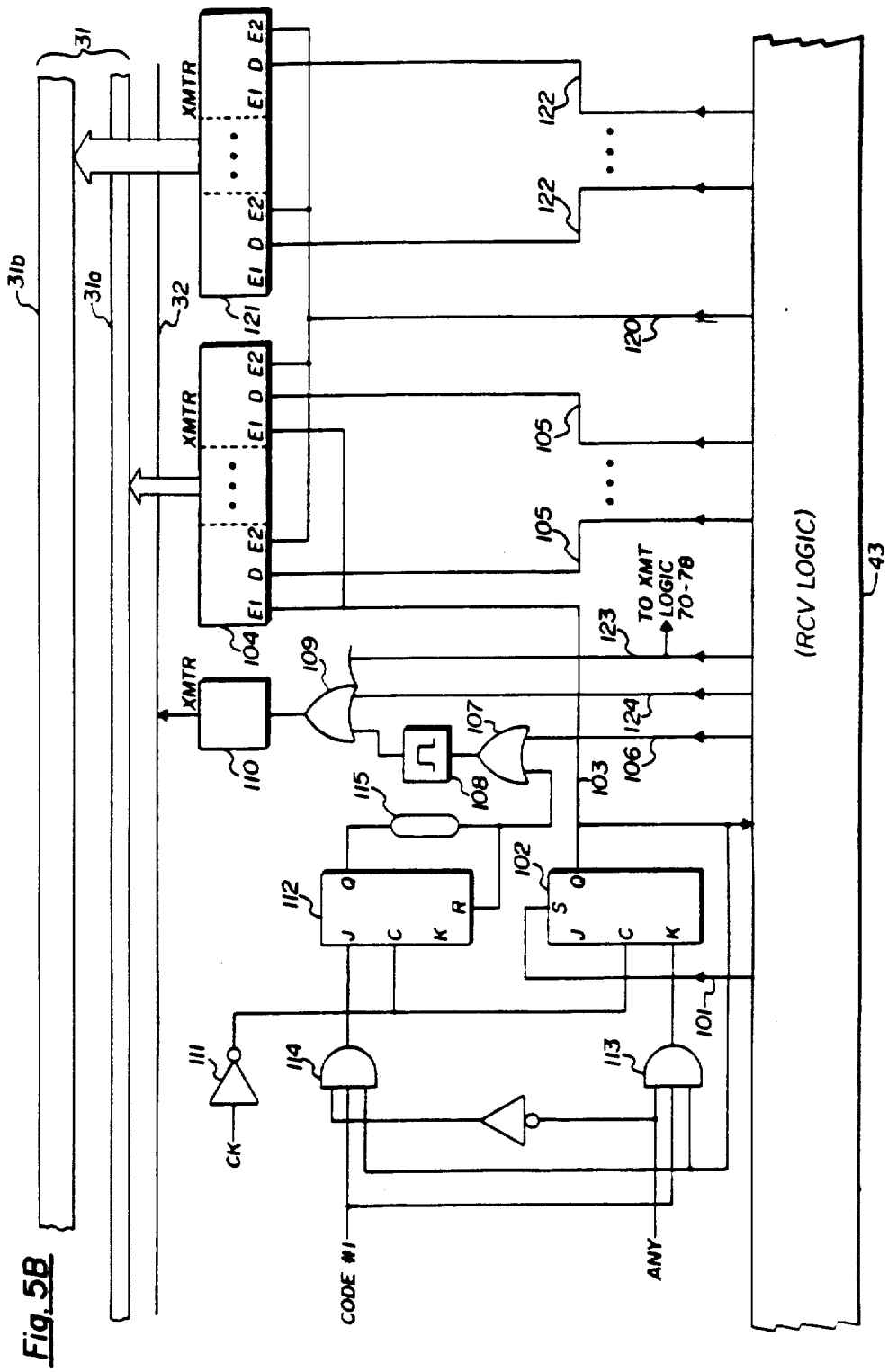

Consider now the logic circuitry of FIGS. 4A, 4B, 5A, and 5B. FIGS. 4A and 4B illustrate circuitry which will enable a device to transmit message on bus 31; whereas FIGS. 5A and 5B illustrate circuitry which will enable a device to receive messages from bus 31. A device can transmit and receive messages on bus 31 if it includes the logic circuitry of all of those figures.

First referring to FIG. 4A, a request to use bus 31 is initiated within a device by sending a negative pulse on a line 41 to a flip-flop 42. This negative pulse is sent by a logic circuit 43 within the device. Logic circuit 43 is illustrated only as a "black box", since its exact makeup is really not relevant for the purposes of this invention. That make-up will depend upon whether the device is a digital computer, a tape, a printer, etc.; and a suitable "black box" could readily be configured by one skilled in those arts.

After flip-flop 42 is set, the logic of FIG. 4A "looks" for a code #1 on lines 31A concurrently with a rising edge of clocking signal CK on line 32. To that end, the signals on lines 31A are passed through a set of receivers 44, decoded by a decoder 45, and sent to an "AND" gate 46. Gate 46 generates the J input signal for flip-flop 47 when flip-flop 42 is set and code #1 simultaneously is present on lines 31A. A clock signal for flip-flop 47 is provided by clocking signal CK on line 32, which flip-flop 47 receives through a receiver 48 and a pair of inverters 49 and 50.

When flip-flop 47 sets, it attempts to enable a plurality of AND gates 51. Each of those AND gates is also coupled to receive a signal on a set of lines 52 from logic circuit 43. That circuit generates a high logic signal on only a selectable one of the lines 52, and thus only the corresponding AND gate generates a high output signal.

A high output signal from one of the AND gates 51 enables a corresponding transmitter in a transmitter set 53. In turn, the enabled transmitter regenerates the signal on its D input on a corresponding one of the bus lines 31B.

Any signals on lines 31B are passed through a set of receivers 54 to a comparator 55. Comparator 55 also receives the one high signal on lines 52. If the signal on lines 52 indicates that this particular device has a higher priority than any of the other devices which are also generating a signal on one of the lines 31B, then comparator 55 sends a high output signal to an AND gate 56.

In turn, gate 56 sends a high signal to the K input of flip-flop 42. Flip-flop 42 will thus reset in response to that signal at the trailing edge of clocking signal CK on line 32. This resetting of flip-flop 42 is sensed and interpreted by logic circuit 43 as a granting of permission to transmit messages on bus 31.

Consider next the logic of FIG. 4B. To transmit a message on bus 31, logic circuit 43 sends a high signal on a lead 61 to the E2 enable inputs of a set of transmitters 62 and to the previously described transmitters 53. Transmitters 62 are provided to generate signals on bus lines 31A which correspond to the signals generated by logic circuit 43 on a set of lines 63. Similarly, the signals which are generated on bus lines 31B correspond to those signals which are generated by logic circuit 43 on the previously described set of lines 52.

All of the clock signals of a message, except the last clock signal, are generated by sending a pulse on a lead 64 to an OR gate 65. Gate 65 drives a transmitter 66 which in turn drives the bus clock line 32. To generate a clock signal for the last word of a message, controller 43 sends a pulse on another lead 67.

Lead 67 couples to an inverter 70, which in turn triggers a flip-flop 71. Flip-flop 71 has its J input coupled high, and thus the flip-flop sets after the last word of a message has been sent. The Q output of flip-flop 71 couples to a pair of flip-flops 72 and 73 through respective AND gates 74 and 75. These two flip-flops monitor the next message which is sent on the bus by the receiving device. If the receiving device sends either a message to a third party, or broadcasts a poll code, then flip-flop 72 sets; whereas if the receiving device sends a messge back to the transmitting device, then flip-flop 73 sets.

A setting of flip-flop 72 is interpreted by logic circuit 43 as meaning that its transactions on the bus are complete. On the other hand, a setting of flip-flop 73 is interpreted by logic circuit 43 as meaning that it has been given back control of bus 31. Lines 76 provide a means whereby logic circuit 43 can sense the state of flip-flops 72 and 73; and line 77 provides a means whereby those flip-flops can be reset after their state is sensed. A NOR gate 78 provides a means for automatically resetting flip-flop 71 after one of the flip-flops 72 and 73 have set.

Next, consider the logic of FIG. 5A. It operates to receive messages from bus 31 which were sent as described above. That logic includes a first-in first-out (FIFO) buffer 81 which stores signals on bus 31B which it receives through a set of receivers 82. Those signals are stored in FIFO 81 only in response to the simultaneous occurrence of clock signal CK on a lead 83 and a high signal on a lead 84. Signal CK on lead 83 is simply the output of a receiver 85 for the bus clock; whereas the other signal on lead 84 is generated by a logic circuit 86.

Gate 86A senses the simultaneous occurrence of code #2 on bus lines 31A and a device address which corresponds to this particular device. A decoder 87 provides for the decoding of that device address. The output of AND gate 86A also sets a flip-flop 86b which remains set until the simultaneous occurrence of a code #4 on bus lines 31A and the trailing edge of clock signal CK. Flip-flop 86b thus provides an enabling signal to FIFO 81 for all words which follow the first word of a multi-word message. Also, AND gate 86C provides an enabling signal to FIFO 81 during the receipt of a single word message.

In order for logic circuit 43 to determine that it has received the last message, a flip-flop 91 is provided. The J enabling signal for flip-flop 91 is generated by an OR gate 92. It has input signal S86c which is generated by the previously described AND gate 86C. A second input signal to OR gate 92 is generated by an AND gate 93 which senses the receipt of the last word of a multi-word message.

Logic circuit 43 senses the set condition of flip-flop 91 on a lead 94, and thereafter resets flip-flop 91 by generating a pulse on a lead 95. It then determines whether the message was loaded into a full buffer by sensing a signal ER on a lead 96 from FIFO 81. Based on the state of signal ER, logic circuit 43 can determine how to respond over bus 31 to the received message.

In addition, circuit 43 may also unload all or a portion of the received message from FIFO 81 prior to generating its response on bus 31. To take a word from FIFO 81, logic circuit 43 merely samples the FIFO output lines 97, and then sends a pulse on line 98 which signals the FIFO to put the next word of the message on the FIFO output lines. In this manner, proper message sequences and context can be checked for.

After logic circuit 43 determines what its response on bus 31 is to be, it utilizes the logic of FIG. 5B to implement that response. In particular, to initiate a polling cycle on bus 31, logic circuit 43 sends a pulse on a line 101 to set a flip-flop 102. Flip-flop 102 couples via a lead 103 to the E1 enable inputs of a set of transmitters 104 for bus lines 31A. With flip-flop 102 providing a high signal to the E1 enable inputs, the transmitters 104 pass any signals on a set of lines 105 onto bus lines 31A. Thus for a polling operation, logic circuit 43 generates a code #1 on the lines 104.

Thereafter, logic circuit 43 sends a pulse on a lead 106. That pulse passes through an OR gate 107 to a pulse circuit, such as a one-shot, 108. Then the output of pulse circuit 108 passes through an OR gate 109 and a transmitter 110 to form the bus clocking signal. One-shot 108 generates clock signal CK with a width $\Delta t1$ as was previously described in conjunction with the timing diagrams of FIGS. 3A and 3B.

Clocking signal CK then passes from receiver 85 of FIG. 5A through an inverter 111 to the trigger input of flip-flops 102 and 112. If any of the devices on bus 31 are generating a steady signal on lines 31B when the trailing edge of signal CK occurs, then flip-flop 102 resets. This is because flip-flop 102 has its K input coupled to the output of AND gate 113 whose inputs are code #1 from decoder 88, and an "ANY" signal from decoder 87 which indicates if a steady signal is present on any of the lines 31B. Resetting flip-flop 102 terminates the polling sequence.

Conversely, if no device on bus 31 generates a steady signal on leads 31B in response to the polling code, then flip-flop 102 remains set and flip-flop 112 also sets. This is because the J input of flip-flop 112 is fed by an AND gate 114 whose inputs are code #1 and the inverse of the "ANY" signal. Flip-flop 112 has its Q output passed through a delay line 115 to produce the previously described time interval of Δt2 between polling cycles. Then after that time interval, the signal from delay line 115 resets flip-flop 112 and retriggers pulse circuit 108, which starts a new polling cycle.

Next, consider the situation where the receiving device does not elect to respond by initiating a polling sequence; but instead responds by sending a single word message to a device on the bus. Under those conditions, logic circuit 43 sets a high signal on a lead 120 which enables transmitters 104 and 121. Then logic circuit 43 generates a code on leads 105 and generates the address of the receiving device and any other information which is to be sent on leads 122. Next, logic circuit sends a pulse on a line 123 to generate a clocking signal for bus 31. Alternatively, multiple word messages may be sent to any device on bus 31 by generating a pulse on a lead 124 for all of the words of the message except the last word, and then generating a pulse on lead 123 for the last word of the message.

A preferred embodiment of the invention has now been described in detail. In addition, however, various changes and modifications may be made to these details without departing from the nature and spirit of the invention. Thus it is to be understood that the invention is not limited to said details but as defined by the appended claims.

What is claimed is:

1. A method of operating a bus in a data processing system over which a plurality of devices send messages, poll signals, and bid signals to each other; said method including the steps of:

broadcasting a poll signal on said bus from the device which received the last message to all of said devices as an immediate response to the received message if the message was received error free;

immediately responding to said poll signal by transmitting a prioritized bid signal on said bus from each device which has a message to send to all of said devices and, as another immediate response to said poll signal, setting an indicator in the device which sent the last message on said bus indicating the message that it sent was received error free and can be discarded;

sending a message, immediately after the bid signal transmission, to a selectable device on said bus from the device that transmitted the highest prioritized bid signal;

repeatedly performing the above steps such that said message, poll signal, and bid signals immediately follow one another from different devices on said bus in a repetitive three signal cycle so long as messages are received error free.

2. A method according to claim 1 and further including the step of:

sending a message on said bus from the device that received the last message to the device that sent said last message as an immediate response to the receipt of said last message, in lieu of broadcasting said poll signal, if said last message was received with an error.

3. A method according to claim 1 and further including the steps of:

broadcasting said poll signal on a first set of lines in said bus;

transmitting said prioritized bid signal on a line that differs for each device in a second set of lines on said bus; and sending said message over the lines of both said first and second set.

4. A method according to claim 1 and further including the step of forming voltage levels on said bus to represent said messages, poll signals, and bid signals.

5. A method according to claim 1 and further including the step of forming current levels on said bus to represent said messages, poll signals, and bid signals.

6. A method of operating a bus in a data processing system over which a plurality of devices send messages, poll signals, and bid signals to each other; said method including the steps of:

broadcasting a poll signal on said bus from the device that received the last message to all of said devices as an immediate response to the receipt of the message if the message was received error free;

transmitting a prioritized bid signal to all of said devices on said bus from each device which has a message to send as an immediate response to said poll signal; and, in the device which sent the last message on said bus, discarding that message as another immediate response to said poll signal;

sending a message, immediately after the bid signal transmission, to a selectable device on said bus from the device that transmitted the highest prioritized bid signal; and repeating the above three steps of broadcasting, transmitting, discarding, and sending in a cyclic fashion with no other intervening signals on said bus until a message is received in error.

* * * * *